United States Patent

[11] 3,552,266

| [72] | Inventor | Walter Tanenblatt |
| | | 12 Fourth Road, Great Neck, N.Y. 11021 |
| [21] | Appl. No. | 737,686 |
| [22] | Filed | June 17, 1968 |
| [45] | Patented | Jan. 5, 1971 |

[54] FLUID PRESSURE CONTROL SYSTEM
6 Claims, 1 Drawing Fig.

[52] U.S. Cl. .................................................. 91/35, 91/424
[51] Int. Cl. .................................................. F15b 21/10, F15b 21/02
[50] Field of Search ...................................... 91/424, 461, 425, 38, 35; 100/137

[56] References Cited
UNITED STATES PATENTS

| 1,851,484 | 3/1932 | Bausman | 91/35X |
| 2,292,846 | 8/1942 | Pritchard | 91/425X |
| 2,346,829 | 4/1944 | Davis | 91/425 |
| 2,382,224 | 8/1945 | Hicks | 91/424X |
| 2,589,019 | 3/1952 | Neuroth | 91/424X |
| 2,986,121 | 5/1961 | Nowack | 91/424 |
| 3,047,017 | 7/1962 | Brinkel | 91/424X |
| 3,170,484 | 2/1965 | Benz et al. | 91/424X |
| 3,428,084 | 2/1969 | Carls | 91/424X |

Primary Examiner—Martin P. Schwadron
Assistant Examiner—Irwin C. Cohen
Attorney—Howard C. Miskin ABSTRACT: A two-hand fluid pressure control system includes a first hand controlled valve having inlets connected to pressure and exhaust and an outlet biased to the pressure inlet and a second hand controlled valve having inlets connected to pressure and exhaust and an outlet biased to the exhaust inlet. The first valve outlet is connected through a shuttle valve to a first actuating cylinder of a fourth valve which controls a machine actuating cylinder, and through a flow control pilot to the actuating cylinder of a third valve. The third valve includes an exhaust inlet and a second inlet connected through a pressure responsive flow timing device to the second valve outlet and an outlet connected to an opposing actuating cylinder of the third valve. A machine actuated valve connects the shuttle valve alternatively to pressure or exhaust.

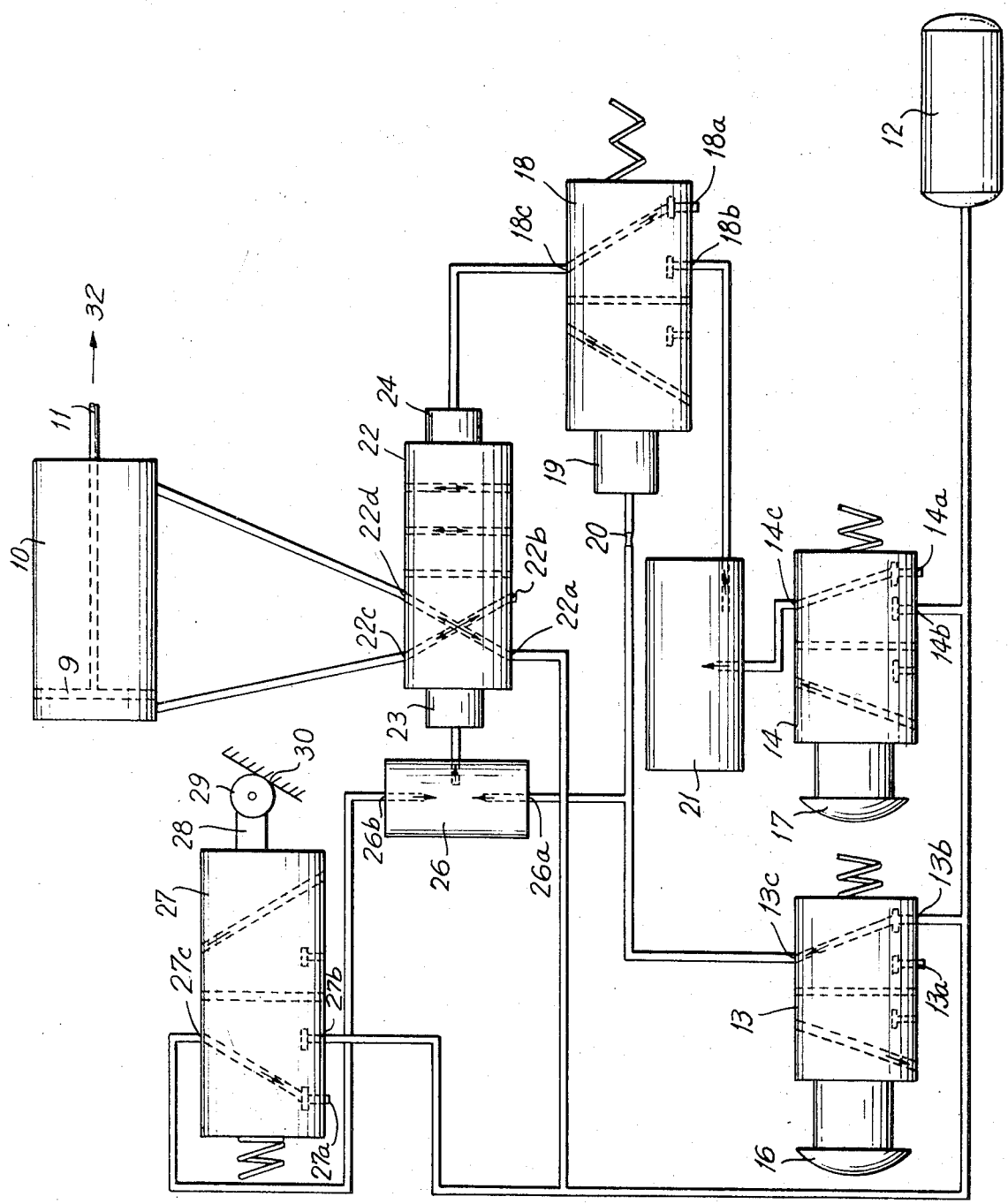

3,552,266

FLUID PRESSURE CONTROL SYSTEM

BACKGROUND OF THE INVENTION

The present invention relates generally to improvements in machinery control devices and it relates generally to an improved safety type machine actuating system requiring the simultaneous use of two hands to initiate the machine operation cycle.

There are many types of manually controlled power driven equipment, as typified by punch presses, stamping presses or the like, which present a physical hazard to the attendant or operator since easy access to the operating components of the machine is necessary attendant to the use of the machine, and such operating components can cause serious injury during the machine operating cycle. There have been accordingly employed and proposed numerous control systems, both of an electrical and pneumatic or hydraulic nature, which require the simultaneous use of two hands to initiate a machine operating cycle. However, those systems heretofore proposed and used possess many drawbacks and disadvantages. They are generally complex and unreliable and frequently lend themselves to bypassing or cheating so as to offset or avoid the safety feature for which they are designed. For example, they may permit inadvertant and undesirable recycling of the machine, they may be simply altered or tied down to permit single hand operation, and otherwise leave much to be desired.

SUMMARY OF THE INVENTION

It is a principal object of the present invention to provide an improved control system for power-driven machines.

Another object of the present invention is to provide an improved two-hand control system for power machinery.

Still another object of the present invention is to provide an improved control for the supply of pneumatic pressure to a pressure responsive machine control device.

A further object of the present invention is to provide a two-hand pressure control system which cannot be readily tampered with to alter it to a one-hand control.

Still a further object of the present invention is to provide a two-hand pressure control system which effects a single non-repetitive machine cycle for each control actuation.

Another object of the present invention is to provide a control system of the above nature which is rugged, reliable, foolproof, and adaptable.

The above and other objects of the present invention will become apparent from a reading of the following description taken in conjunction with the accompanying drawing which illustrates a preferred embodiment thereof.

In a sense the present invention contemplates the provision of a two-hand fluid-pressure control system comprising first and second valves normally urged to first positions and individually actuatable to second positions, a third valve normally urged to a first position and actuatable to a second position and including an inlet and an outlet, first timing means responsive to the actuation of said first valve for actuating said third valve a predetermined interval following said first valve actuation, second timing means responsive to the actuation of said second valve for effecting the flow of a pressurized fluid to said third valve inlet for a predetermined interval, and actuating means responsive to the pressure at said third valve outlet.

Accordingly, in a preferred form of the improved system, the hand operated first and second valves are three-way valves, each including an outlet and first and second inlets connected to exhaust and a pressurized fluid respectively, the first valve being biased to connect its outlet to the second or pressure inlet and the second valve being biased to connect its outlet to the first or exhaust inlet. The third valve includes an actuating cylinder connected through a restricted flow control pilot or valve to the first valve outlet and the outlet of the hand operated second valve is connected through a timed valve device or the like, which is open in the absence of pressure and closes a predetermined interval following the application of pressure, to a first inlet of the third valve. A second inlet of the third valve is connected to exhaust. The third valve is biased to connect its outlet to exhaust. A fourth four-way valve includes opposing actuating cylinders, one of which is connected to the third valve outlet and the other of which is connected to the outlet of a shuttle valve, a first inlet of which is connected to the first valve outlet. The fourth valve controls the application of pressure to a machine actuating cylinder. The opposite second inlet to the shuttle valve is connected alternatively to pressure or exhaust by way of a three-way valve actuated by the controlled machine.

The improved system is safe, reliable, rugged and substantially tamperproof.

BRIEF DESCRIPTION OF THE DRAWING

The drawing is a diagrammatic view of a system employing the present invention, illustrated as controlling the actuating cylinder of a machine actuating clutch and shown in a ready condition.

DESCRIPTION OF THE PREFERRED EMBODIMENT

Referring now to the drawing, which illustrates a preferred embodiment of the present invention, the reference numeral 10 generally designates a double acting cylinder having inlet ports at opposite ends and including a piston 9 provided with a piston rod 11 connected to and actuating a machine component, for example, the clutch of a power driven punch press of the like, the clutch being engaged when the piston rod 11 is advance and disengaged when the piston rod 11 is retracted, as shown. The cylinder 10 as well as the control system is fluid energized by a source of compressed air 12, illustrated as a tank, provided with suitable distributing piping for connecting it to the various control system components, as will be hereinafter set forth.

The control system includes a pair of first and second manually operated three-way valves 13 and 14 respectively. The first valve 13 is provided with an operating pushbutton 16, a first inlet port 13a connected to exhaust, a second inlet port 13b connected to the pressure source 12 and an outlet port 13c. The valve 13 is spring biased to interconnect inlet port 13b and outlet port 13c in the normal position, and depression of the button 16 switches the outlet port 13c from inlet port 13b to communication with inlet port 13a. The second valve 14 is provided with an operating pushbutton 17, a first inlet port 14a connected to exhaust, a second inlet port 14b connected to pressure and an outlet port 14c. The valve 14 is spring biased to interconnect inlet port 14a and outlet port 14c in their normal position, and depression of the button 17 switches the port 14c from inlet port 14a to inlet port 14b.

A pressure actuated three-way valve 18 includes first and second inlet ports 18a and 18b respectively and an outlet port 18c alternatively communicating with inlet ports 18a or 18b. The valve 18 is actuated by a pneumatic cylinder 19 and is spring biased to interconnect outlet port 18c and inlet port 18a, which communicates with exhaust and upon, pressurizing of the cylinder 19, interconnects outlet port 18c with inlet port 18b. The valve outlet port 13c is connected through a flow control valve or pilot 20 to the cylinder 19 to limit the flow of fluid from the cylinder 19 during the exhaust thereof so that the cylinder 19 when connected through the pilot 20 and valve 13 to exhaust holds the valve 18 in its advanced position for a predetermined period, preferably adjustable, for example, between 1 second to about 3 seconds before valve 18 returns to its biased position.

The valve outlet 14c is connected through a fluid pulse timing device 21 to the valve inlet port 18b. The fluid pulse timing device 21 is of well known construction which, in the absence of pressure at its inlet port is open to its outlet port and upon the feed of a pressurized fluid to its inlet permits the flow thereof to the output for a predetermined short interval, for example, about 10 milliseconds, and thereafter stops the flow to the outlet until the pressure at the inlet is relieved, whereafter another fluid pulse may be transmitted by applying pressure to the inlet. An example of a fluid pulse forming device 21 which may be employed is the Logic Diff Function, marketed by Aro Corp.

A pressure actuated four-way valve 22 includes inlet ports 22a and 22b and outlet ports 22c and 22d and opposing actuating cylinders 23 and 24 respectively. The actuating cylinders 23 and 24 and the ports of valve 22 are so related that exhausting of cylinder 23 and pressurizing of cylinder 24 connects inlet port 22a to outlet port 22d and inlet port 22b to outlet port 22c and exhausting of cylinder 24 and pressurizing of cylinder 23 connects inlet port 22a to outlet port 22c and inlet port 22b to outlet port 22d. Simultaneously pressurizing or exhausting both cylinders 23 and 24 does not effect any shifting of the valve 22. The cylinder 24 is connected to valve outlet 18c and the cylinder 23 is connected to the outlet of a shuttle valve 26 including a first inlet 26a connected to the valve outlet port 13c and an opposite inlet port 26b.

The valve inlet port 22a is connected to the pressure source 12 and the inlet port 22b is connected to exhaust. The outlet port 22c is connected to the rear or left end of the cylinder 10 and the outlet port 22d is connected to the front or right end of the cylinder 10, as seen.

A cam operated three-way valve 27 includes a first inlet port 27a connected to exhaust, a second inlet port 27b connected to the pressure source 12 and an outlet port 27c connected to the shuttle valve inlet port 26b. The valve 27 is biased to connect ports 27a and 27c and is actuated by a control rod 28 carrying a follower 29. The follower 29 engages a cam 30 which is actuated with the controlled machine and is provided with a short rise section for momentarily shifting the valve 27 at near the termination of a machine cycle whereby to momentarily interconnect ports 27b and 27c.

Considering now the operation of the improved control system described above, in its rest ready condition, the valves 13 and 14 are in their released position, as shown in the drawing, the valve 13 opening the valve actuating cylinder 19 to the pressure source to position or advance the valve 18 so as to connect through valve 18, the actuating cylinder 24, pulsing device 21, and valve 17 to exhaust. The cylinder 23 is connected through shuttle valve 26 and valve 13 to the pressure source, so that the valve 22 is in the illustrated retracted position connecting the front and rear of cylinder 10 to pressure and exhaust respectively and retract the clutch actuating piston rod 11.

The simultaneous depression of pushbuttons 16 and 17 effects the advance of the piston rod 11, in the direction of arrow 32. The depression of button 16 connects cylinder 19 to exhaust through the flow control pilot 20 and connects the cylinder 23 to exhaust through the shuttle valve 26. By reason of the flow control pilot 20 the valve 18 remains in its advanced position for a short predetermined interval so that the depression of the valve button 17 during this interval effects the transmission of a short pressure pulse from the pressure source 12 through valve 14, timing or pulsing device 21 and valve 18 to cylinder 24, thereby advancing the valve 22 to connect inlet 22a to outlet 22c to pressurize the left end of cylinder 10 and to connect inlet 22b to outlet 22d to exhaust the right end of cylinder 10. The piston rod 11 is thus advanced in direction of arrow 32 to actuate the associated clutch and initiate a machine cycle.

A predetermined short interval after the depression of the button 16 the valve 18 is retracted to its biased position by reason of the exhaust of cylinder 19 through pilot 20 and cylinder 13, and the cylinder 24 is exhausted through the valve 18. Upon the completion of the machine cycle the valve 27 is momentarily advanced by the cam 30 to connect the cylinder 23 to pressure through valves 26 and 27, whereby to return the valve 22 to its initial position connecting the right and left ends of the cylinder 10 to exhaust and pressure respectively, whereby to retract the piston rod 11, disengage the clutch and terminate the machine cycle. Continued depression of either or both valves 16 and 17 will not recycle the machine since either valve 18 remains retracted or device 21 is inactive or both. To repeat the machine cycle both buttons 16 and 17 must be fully released and substantially simultaneously depressed, as aforesaid.

The tie down of either button 16 or 17 will prevent actuation of the machine by the control network. If the button 16 is tied down the valve 18 will assume a steady position exhausting the cylinder 24 since cylinder 19 is connected to exhaust, thereby preventing the advancing of the valve 22 to a position which connects the left end of the cylinder 10 to pressure and the right end to exhaust. On the other hand, if the button 17 is tied down the cylinder 24 cannot be pressurized after its first exhaust since the pulsing device 21 being under continuous pressure will not effect the flow of pressure fluid pulses to the cylinder 24 and the valve 22 and the cylinder 10 will remain in their illustrated retracted positions.

Further, if either of buttons 16 or 17 is first depressed and the other button is depressed later, then the time set by pilot 20 to exhaust cylinder 19, cylinder 24 and valve 22 and cylinder 10 will remain in their illustrated positions. If valve 16 is first depressed, cylinder 19 is connected to exhaust through pilot 20, which retains valve 18 in its advance position for a short, predetermined interval. After this interval if button 17 is depressed, the machine will not actuate, since cylinder 19 is now exhausted, thereby preventing valve 22 from advancing. If button 17 is first depressed, a short pressure pulse is transmitted from device 21 through valve 18 to cylinder 24; however, since cylinder 23 is still connected to the pressure source 12, valve 22 does not advance. If valve 16 is now depressed, no further pulse will be forthcoming from device 21, so the machine will not be actuated.

While there has been described and illustrated a preferred embodiment of the present invention, it is apparent that numerous alterations, omissions and additions may be made without departing from the spirit thereof.

I claim:

1. A two-hand fluid pressure control system comprising a pressurized fluid source, first and second valves normally urged to first positions and individually manually actuatable to second positions, a third valve normally urged to a first position and actuatable to a second position and including an inlet and an outlet, first timing means responsive to the actuation of said first valve for actuating said third valve a predetermined interval following said first valve actuation, second timing means responsive to the actuation of said second valve for effecting the flow of the pressurized fluid to said third valve inlet for a predetermined interval, actuating means responsive to the pressure at said third valve outlet, said first and second valves including first inlets connected to said fluid source and second inlets connected to exhaust, said first valve first position connecting said respective outlet and first inlet and said second valve first position connecting said respective outlet and second inlet, said first timing means including an actuating cylinder for said third valve and means controlling a flow control device connecting said third valve actuating cylinder to said first valve outlet, and said second timing means including an inlet connected to said second valve outlet and an outlet connected to said third valve inlet and a normally open valve device between said second timing means outlet and inlet closable after a predetermined interval in response to a predetermined pressure at said timing means inlet, a fourth valve including a first actuating cylinder and an opposing second actuating cylinder defining said actuating means, means connecting said fourth valve first cylinder to said first valve outlet, and means connecting said fourth valve second cylinder to said third valve outlet.

2. The control system of claim 1, including a machine-actuating cylinder including an inlet, said fourth valve including an outlet connected to said machine-actuating cylinder inlet and first and second inlets connected to said pressurized fluid source and exhaust respectively, and alternatively connected to said fourth valve outlet in response to the pressure differential in said fourth valve-actuating cylinders.

3. The control system of claim 1, including a double acting machine-actuating cylinder having opposing first and second inlets, said fourth valve including first and second outlets connected to said machine-actuating cylinder first and second inlets respectively and first and second inlets connected to said pressurized fluid source and exhaust respectively, and alternatively connected to respective outlets of said fourth valve in response to the pressure differential in said fourth valve-actuating cylinders.

4. The control system of claim 1, wherein said means connecting said fourth valve first cylinder and said first valve outlet includes a shuttle valve.

5. The control system of claim 1, wherein means connecting said fourth valve first cylinder and said first valve outlet includes a shuttle valve, and comprising a fifth valve including first and second inlets connected to said pressurized fluid source and exhaust respectively, and an outlet connected to said shuttle valve and alternatively to said fifth valve first and second inlets, a machine-actuating cylinder including an inlet, said fourth valve including an outlet connected to said machine-actuating cylinder inlet and first and second inlets connected to said pressurized fluid source and exhaust respectively and alternatively connected to said fourth valve outlet in response to the pressure differential in said fourth valve-actuating cylinders, and means response to a condition of said machine for actuating said fifth valve.

6. A two-hand pressure control system comprising a pressurized fluid source, first and second valves normally urged to first positions and including means for individually manually actuating said first and second valves to second positions, and including outlets, first inlets connected to said fluid source, and second inlets connected to exhaust, said first valve first position connecting said respective outlet and first inlet, and said second valve first position connecting said respective outlet and second inlet, a third valve normally urged to a first position and actuatable to a second position and including an inlet and an outlet, first timing means responsive to the actuation of said first valve for actuating said third valve a predetermined interval following said first valve actuation and including an actuating cylinder for said third valve and means including a flow control device connecting said third valve actuating cylinder to said first valve outlet, second timing means responsive to the actuation of said second valve for effecting the flow of a pressurized fluid to said third valve inlet for a predetermined interval, said second timing means including an inlet connected to said second valve outlet and an outlet connected to said third valve inlet and a normally open valve device between said second timing means outlet and inlet closable after a predetermined interval in response to a predetermined pressure at said second timing means inlet, a fourth valve including a first actuating cylinder and an opposing second actuating cylinder, a shuttle valve having an outlet connected to said fourth valve first cylinder and a first inlet connected to said first valve outlet and an opposing second inlet, a fifth valve including first and second inlets, connected to said pressurized fluid source and exhaust respectively, and an outlet connected to said shuttle valve second inlet and alternatively to said fifth valve first and second inlets, a machine-actuating cylinder including an inlet, said fourth valve including an outlet connected to said machine-actuating cylinder inlet and first and second inlets connected to said pressurized fluid source and exhaust respectively and alternatively connected to said fourth valve outlet in response to the pressure differential in said fourth valve-actuating cylinders, and means responsive to a condition of said machine for actuating said fifth valve.